United States Patent [19]

Walsh

[11] 4,011,360
[45] Mar. 8, 1977

[54] ELECTRICALLY CONDUCTIVE SILICONE RUBBER STOCK

[75] Inventor: Thomas William Walsh, North Andover, Mass.

[73] Assignee: Chomerics, Inc., Woburn, Mass.

[22] Filed: Jan. 23, 1976

[21] Appl. No.: 651,806

Related U.S. Application Data

[63] Continuation of Ser. No. 459,486, April 10, 1974, abandoned.

[52] U.S. Cl. .............................. 428/402; 252/514; 260/37 SB; 174/35 GC; 174/35 MS
[51] Int. Cl.² ............................................ B32B 5/16
[58] Field of Search ............... 252/511, 512, 514; 260/37 SB; 428/402; 174/35 MS, 35 GC

[56] References Cited

UNITED STATES PATENTS 3,032,528 5/1962 Nitzsche et al. ............... 260/37 SB 3,140,342 7/1964 Ehrreich et al. ................... 252/512

OTHER PUBLICATIONS

Patent Office Publication No. 4985/58, Electroconductive Resin Moulding Material; Mizuno et al, July 3, 1958.

*Primary Examiner*—Benjamin R. Padgett
*Assistant Examiner*—E. Suzanne Parr
*Attorney, Agent, or Firm*—Donald Brown; Sewall P. Bronstein

[57] ABSTRACT

Room temperature moisture curing electrically conductive silicone rubber stock comprising a mixture of siloxane polymer, an aminosilane or aminosilazane curing agent and electrically conductive particles having an outer surface of noble metal. The electrically conductive stock of this disclosure is useful for electromagnetic shielding and for electrical grounding.

11 Claims, 3 Drawing Figures

ELECTRICALLY CONDUCTIVE SILICONE RUBBER STOCK

This is a continuation of application Ser. No. 459,486 filed Apr. 10, 1974, now abandoned.

BACKGROUND OF THE DISCLOSURE

Over the years there has been a continuing demand for a flexible, one-component, room temperature curing electrically conductive material for use in the electronic industry as electromagnetic shielding as well as for electrical grounding applications.

While various materials of the above type have been offered, the cost and performance thereof have been a major factor which has tended to limit the applications and/or use of the prior art materials.

Accordingly, a new and improved one-component room temperature curing electrically conductive material was needed which would not only provide consistently high performance but would also be saleable at relatively low cost.

In the prior art there is disclosed at least three basic classes of curing agent which have been used to prepare non-conductive one component, room temperature moisture curable silicone rubber.

These agents generally are classified as:
1. the titanium curing or cross-linking agents such as shown in U.S. Pat. No. 3,334,067;
2. the organosiloxane acyloxy curing or cross-linking agents such as referred to U.S. Pat. No. 3,277,047; and
3. the aminosilane or aminosilazane curing or cross-linking agents such as disclosed in U.S. Pat. No. 3,032,528 and German Pat. No. 1,120,690.

This invention is based at least in part upon the unexpected discovery that electrically conductive particles supporting an outer noble metal surface e.g., an insulating or dielectric core supporting an outer noble metal surface such as glass coated with silver when intermixed with a siloxane polymer and an amine curing vulcanizing or cross-linking agent such as disclosed in U.S. Pat. No. 3,032,528 which is incorporated herein by reference hereto (rather than a titanium or organosilicon acyloxy curing agent) within certain limits and kept in an anhydrous state (away from moisture) will upon use and in the presence of moisture at room temperature cure to provide a highly electrically conductive flexible cured silicone rubber.

Applicant has discovered in attempts made to produce a product comparable to the present invention, that is by using siloxane polymer containing the aforementioned titanium or organo-silicon acyloxy curing agents, mechanical or electrically useless or comparatively unsuccessful shielding or grounding silicone rubber products are prepared.

BRIEF DESCRIPTION OF THE DISCLOSURE

Figure 1:
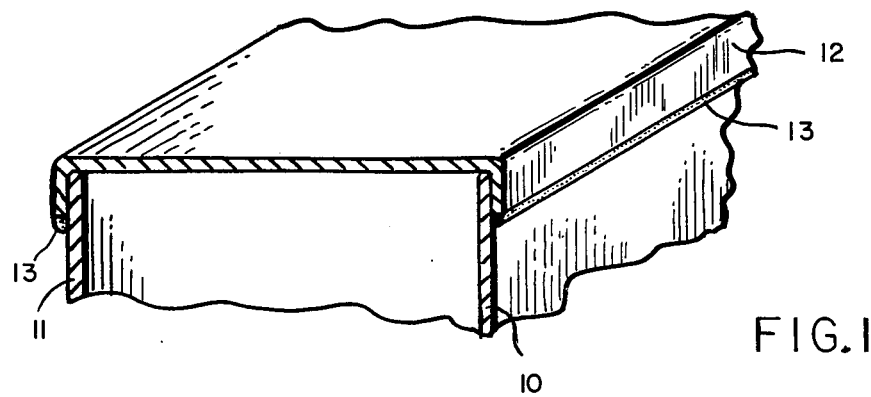
FIG. 1 is a perspective view of a cabinet for electronic equipment showing the use of the conductive stock of this disclosure used in an electromagnetic shielding application.

This invention provides a one component room temperature curing or vulcanizing electrically conductive silicone rubber stock which is storable at room temperature under anhydrous conditions e.g., in a sealed tube, and which when used under atmospheric conditions e.g., by squeezing it out of the tube at room temperature will cure to provide a highly electrically conductive and mechanically strong material suitable for electromagnetic energy shielding or for use as an electrical ground.

The electrically conductive stock of this invention comprises essentially:

1. 75 to 98 parts by weight (PBW), more preferably 75 to 95 PBW and most preferably 75 to 90 PBW of electrically conductive particles preferably of a non-electrically conductive (insulator) or dielectric material core having an outer surface of a noble metal;

2. 2 to 25 PBW, more preferably 5 to 25 PBW and most preferably 10 to 25 PBW of a linear siloxane polymer of the average molecular formula $R'R_2SiO[R_2SiO]_xSiR_2R'$ wherein each R is a monovalent hydrocarbon radical or a halogenated monovalent hydrocarbon radical, each R' is a hydrogen atom, alkoxy radical, aryloxy radical, hydroxy radical or acyloxy group and $x$ has an average value of from 50 to 10,000; and 3. 0.0005 to 0.02 parts by weight (based on each 1 part by weight of the siloxane polymer) of an aminosilane of the formula $R''_nSi(NY_2)_{4-n}$ or an aminosilazane of the formula

$$(Y_2N)_aR''_bSiNH[R''_b(Y_2N)_cSiNH]_mSiR''_b(NY_2)_a$$

wherein each R'' is an alkyl radical, aryl radical, or aralkyl radical, each Y is a hydrogen atom, alkyl radical, aryl radical or aralkyl radical, $n$ is 0 or 1, $m$ is at least 1, $a$ is 2 or 3, $b$ is 0 or 1, and $c$ is 1 or 2.

The operable siloxanes (2) are linear polymers having reactive endblocking atoms or radicals. These polymers consist primarily of diorganosiloxane units of the formula $R_2SiO$ with up to 2 mol percent of $RSiO_{3/2}$ units. The radicals represented by R can be alkyl radicals such as methyl, ethyl and octadecyl, aryl radicals such as phenyl and anthracyl, alkaryl radicals such as tolyl and xylyl, aralkyl radicals such as benzyl and phenylethyl, cycloaliphatic radicals such as cyclopropyl and cyclobutyl and alkenyl radicals such as vinyl, allyl and octadecenyl and halogenated derivatives of such radicals such as chloromethyl, chlorofluroethyl, 3,3,3-trifluoropropyl, bromophenyl, chlorobenzyl, chlorovinyl, and so forth. It is preferred that at least 75 percent of the radicals represented by R be methyl radicals.

The endblockers are hydrogen atoms, hydroxy radicals, alkoxy radicals, aryloxy radicals or acyloxy radicals, all of which are reactive in the system of this invention.

The preferred endblockers because of ease of preparation, commercial availability and reactivity are the hydroxy radicals. Thus, hydroxy endblocked dimethylsiloxane polymers are a preferred species for this invention.

The siloxane polymers employed herein can vary from relatively thin fluids averaging about 10 siloxane units per molecule to gums having up to about 10,000 siloxane units per molecule. It has been noted, however, that rubbers having good physical properties, cannot be obtained consistently with polymers of less than 50 units per molecule and the heavier gums are difficult to process.

The polymers can be homopolymers wherein all of the linear units are the same such as

where Me is methyl or OH endblocked copolymers of units such as PhMeSiO,Me₂SiO and MeViSiO where Me is methyl, Ph is phenyl and Vi is vinyl. Mixtures of polymers and/or copolymers can also be employed.

The aminosilicon compositions employed herein can be aminosilanes and/or aminosilazanes. The aminosilanes are preferred because they are readily prepared, are less expensive, and exhibit reactivity superior to that of the silananes. The aminosilanes operable herein contain 3 or 4 amino substituents per Si atom and 0 or 1 alkyl radical, aryl radical or aralkyl radical per Si atom. Thus tri- or tetrafunctional silanes are employed and the tetrafunctional silanes are more reactive hence will bring about a more rapid vulcanization than can be obtained with the trifunctional silanes. Furthermore, among the trifunctional silanes, alkyl substituted silanes are more reactive than aryl and aralkyl substituted silanes. In general, the operable aminosilanes are of the formulas R″SI(NY₂)₃ and Si(NY₂)₄, where R″ is an alkyl radical such as methyl, ethyl, propyl or octadecyl, and aryl radical such as phenyl or anthracyl or an aralkyl radical such as benzyl or phenylethyl and each Y is H, or an alkyl, aryl oralkyl radical as defined for R″. Mixtures of the defined aminosilanes can be employed.

The operable aminosilanes are prepared by known methods. The preferred method of preparation involves reacting a silance containing hydrogen, a halogen or an alkoxy substituent with a primary or secondary amine. Suitable silane reactants include $SiCl_4$, $Si(OC_2H_3)_4$, $CH_3SiCl_3$, $CH_3Si(OC_3H_7)_3$, $C_6H_5Si(OCH_3)_3$, $C_6H_5SiCl_3$ and $C_6H_5SiH_3$. Suitable amine reactants include aliphatic, aromatic and aralaphatic primary and secondary amines as well as ammonia. Operable amines include monobutylamine, diethylamine, aniline and methylaniline.

The electrically conductive particles of this invention may comprise various materials such as glass, ceramics and plastics which are insulators or dielectric coated with a layer of a noble metal such as silver, gold, etc. The preferred form of the particle is a sphere since this offers ease of mixing, high loadings and ease of handling, and storage.

The particle size may be between 5 microns to 10000 microns with an average particle size of about 40–50 microns being preferred. The noble metal thickness coating may be between about 0.04 to 0.12 microns with a coating thickness of about 0.04 to 0.08 microns being preferred.

The conductive silicone stock of this invention is prepared by mixing throughly the siloxane polymer and aminosilane or silazane. Generally, the amount of silane or silazane (curing agents) should be between 0.0005 to 0.02 parts by weight based on each part by weight or siloxane polymer but excess quantities of the curing agents may be tolerated.

In mixing the ingredients, that is the siloxane polymer, the curing agent and the particles having an outer layer of noble metal, a solvent such as toluene, benzene, heptane and trichlorethylene may be added if needed. The solvent should be one that is volatile and evaporates during room temperature curing.

The conductive compositions of this invention can also contain pigments, flavorings and, if desired, essential oils in minor amounts (i.e. less than 1% by weight of the mixture). More commonly, fillers will be employed in the silicone rubber stocks of this invention. Basic fillers such as zinc carbonate, zinc oxide, calcium oxide, calcium carbonate, magnesium oxide and magnesium carbonate can be employed and will often act as accelerators in securing a rapid vulcanization of the rubber in deep section. Further inert fillers such as diatomaceous earth, quartz flour and glass fibers, among others, can be used as well as reinforcing silicas such as fume silica and silica aerogels.

The conductive silicone rubber stocks of this invention can be stored in essentially water and air tight tubes, cans or other containers and will remain workable and usable for months.

The mixtures can be molded, extruded, shaped or otherwise worked for a short period of time and exposed to atmospheric moisture whereupon vulcanization and cure to an elastomeric product is accomplished. The rate of vulcanization is dependent upon the amount of atmospheric moisture present and under very low humidity conditions it may be necessary to add moisture to the surrounding air to obtain a practical rate of vulcanization. Other factors relating directly to rate of vulcanization include depth of layer, molecular weight of the polymer employed, functionality of the silane employed, and the nature of the organic substituents as well as the nature of the amino substituents in the silane. Deeper sections will vulcanize more slowly because the atmospheric moisture must penetrate into the polymer to effect the vulcanization. The greater the molecular weight of the polymer, the more rapid will be the vulcanization.

As discussed above, the tetraaminosilanes are more reactive and bring about a more rapid vulcanization than triaminosilanes, and the triaminoorganosilanes having a lower alkyl radical as the organic substituent are faster vulcanizing agents than those having higher alkyl, aryl or aralkyl substituents. Finally, the rate of vulcanization can be increased by employing silanes having primary aliphatic amines as contrasted to secondary aliphatic amines and primary or secondary aromatic amines.

The conductive silicone rubber stocks of this invention can be used as sealing materials exhibiting stability to heat, and cold in shielding and grounding applications.

Reference should now be had to FIG. 1 which shows the conductive rubber stock of this invention used in a shielding application. At 10 and 11 there are shown the metal walls of an electronic equipment cabinet having positioned on top thereof a metal cover 12. At 13 there is shown a bead of conductive rubber stock 13 (used as putty) for providing an electromagnetic shield to prevent the passage of electromagnetic energy from the interior of the cabinet between the walls 10 and 11 and the cover 12.

Figure 2:
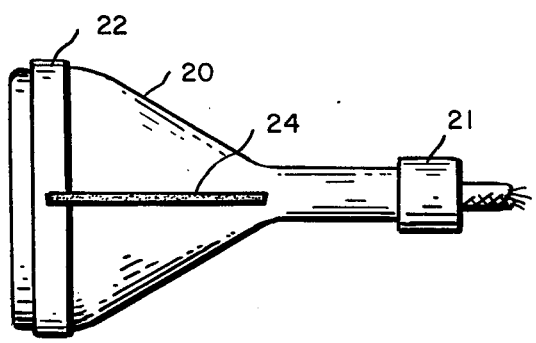
FIGS. 2 and 3 are top and side views of a cathode ray tube showing the use of the conductive stock of this disclosure in an electrical grounding application.
Figure 3:
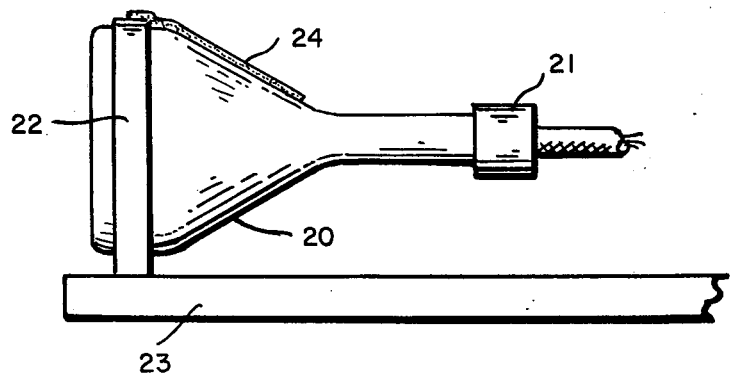

In FIG. 2 there is shown a cathode ray tube 20 having a yoke 21 and supported by a metal grounding strap to the metal chassis 23. At 24 there is shown a strip or bead (which may be squeezed from a tube) of the conductive rubber stock of this invention used to ground the carbon resistor on the tube surface to the strap 22.

The following examples are included herein to aid in the understanding and employing of this invention. The scope of the invention is delineated in the claims and is not limited by the examples. In the examples all parts are by weight.

EXAMPLE I 25 parts by weight (PBW) of SWS-940 (Staufer Chemical Co.) RTV (room temperature vulcanizing) silicone rubber (which includes the siloxane polymer and the aminosilane curing agent) was mixed with 75 PBW of silver coated glass spheres S-3000-S (sold by Potters Bros. Inc., Carlstadt, N.J.), and 16 PBW of toluene on a mixing mill. The material was then coated on a slide and permitted to cure at room temperature at 50 percent humidity in 24 hours while the toluene evaporated.

EXAMPLE II 20 parts by weight (PBW) of SWS-T-49 (50 percent solids) RTV silicone rubber made by Staufer Chemical Co. (and which includes the silioxane polymer and the aminosilane curing agent) and 80 PBW of S - 3000 - S are mixed together with 10PBW benzene on a mixing mill. Thereafter the material was coated on a slide and permitted to cure.

EXAMPLE III

95 PBW S - 3000 - S is mixed with 5 PBW of SWS - 940 and 15 PBW of toluene on a mill. Thereafter a sample thereof is permitted to cure.

EXAMPLE IV

90 PBW S - 3000 - S is mixed with 10 PBW of SWS - 940 and 15 PBW of toluene on a mill. Thereafter the mixture is coated on a surface.

EXAMPLE V

A mixture of 100 parts hydroxy endblocked dimethylsiloxane polymer of 10,500 cs. viscosity at 25° C and 0.5 part $MeSi(NBu_2)_3$ is mixed on a mill. Thereafter 900 parts of S-3000-S silver coated particles is mixed therewith and coated on a surface and permitted to cure.

EXAMPLE VI

Example V is repeated employing $Si(NBu_2)_4$ and $Si(NHE_t)_4$ or $Si(NHBu)_4$ as the aminosilane.

EXAMPLE VII

Example V is repeated employing $MeS_i(HNC_6H_{11})_3$ as the amino silane.

I claim:
1. An uncured one component room temperature moisture curing electrically conductive RTV silicone rubber stock stored under anhydrous conditions and which will remain essentially uncured when so stored at room temperature and which comprises the mixture of essentially:
   1. 75 to 98 parts by weight (PBW) of electrically conductive particles each comprising glass cores having an outer surface of silver;
   2. 2 to 25 PBW of a linear siloxane polymer of the average molecular formula $R'R_2SiO[R_2SiO]_x\text{-}SiR_2R'$ wherein each R is a monovalent hydrocarbon radical or a halogenated monovalent hydrocarbon radical, each R' is a hydrogen atom, alkoxy radical, aryloxy radical, hydroxy radical or acyloxy group and $x$ has an average value of from 50 to 10,000; and
   3. 0.0005 to 0.020 parts by weight, based on each part by weight of the siloxane polymer, of a curing agent which is an aminosilane of the formula $R''_n\text{-}Si(NY_2)_{4-n}$ or an aminosilazane of the formula

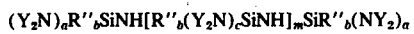

wherein each R'' is an alkyl radical, aryl radical, or aralkyl radical, each Y is a hydrogen atom, alkyl radical, aryl radical or aralkyl radical, $n$ is 0 or 1, $m$ is at least 1, $a$ is 2 or 3, $b$ is 0 or 1, and $c$ is 1 or 2.

2. The stock of claim 1 wherein the curing agent is an aminosilane.

3. A bead of the cured stock of claim 1 as an electromagnetic energy shield.

4. A strip of the cured stock of claim 1 as an electrical ground.

5. The stock of claim 1 wherein the electrically conductive particles at 75 to 95 PBW.

6. The stock of claim 1 wherein the electrically conductive particles are 75 to 90 PBW.

7. The stock of claim 2 wherein the electrically conductive particles comprise 75 to 95 PBW.

8. The stock of claim 7 wherein the electrically conductive particles comprise 75 to 90 PBW.

9. The stock of claim 1 wherein the siloxane polymer comprises 5 to 25 PBW.

10. The stock of claim 1 wherein the siloxane polymer comprises 10 to 25 PBW.

11. The stock of claim 1 stored in a sealed tube.

* * * * *